(12) United States Patent
Ericksen et al.

(10) Patent No.: US 12,466,508 B2
(45) Date of Patent: Nov. 11, 2025

(54) ORIENTATIONALLY FLEXIBLE BUMP SENSOR

(71) Applicant: Fox Factory, Inc., Duluth, GA (US)

(72) Inventors: Everet Owen Ericksen, Woodland, CA (US); Andrew Diao, Santa Cruz, CA (US); Mike Fraguglia, Santa Cruz, CA (US); Evan Peterson, Santa Cruz, CA (US); James T. Pickett, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 741 days.

(21) Appl. No.: 17/673,806

(22) Filed: Feb. 17, 2022

(65) Prior Publication Data

US 2022/0266939 A1    Aug. 25, 2022

Related U.S. Application Data

(60) Provisional application No. 63/152,668, filed on Feb. 23, 2021.

(51) Int. Cl.
*B62J 45/423* (2020.01)
*B62J 45/20* (2020.01)
(Continued)

(52) U.S. Cl.
CPC .............. *B62J 45/423* (2020.02); *B62J 45/20* (2020.02); *B62J 45/412* (2020.02); *B62J 45/414* (2020.02);
(Continued)

(58) Field of Classification Search
CPC ........ B62J 45/412; B62J 45/20; B62J 45/414; B62J 45/4152; B62J 45/4151; B62J 45/41; G01P 15/00
See application file for complete search history.

(56) References Cited

U.S. PATENT DOCUMENTS 6,321,141 B1   11/2001   Leimbach
7,484,603 B2   2/2009    Fox
(Continued)

FOREIGN PATENT DOCUMENTS

CN    104075699 A    10/2014
CN    106323226 B    9/2018
(Continued)

OTHER PUBLICATIONS

European Search Report for European Application No. 22158311.5, 12 Pages, Jul. 1, 2022.
(Continued)

*Primary Examiner* — Michael J Dalbo
*Assistant Examiner* — Kaleria Knox

(57) ABSTRACT

An orientationally flexible bump sensor is disclosed. The system includes at least one bump sensor mounted to a vehicle, the at least one bump sensor comprising at least two axes of measurement. A computer processor is configured to evaluate the at least two axes of measurement to determine which axis of the at least two axes of measurement has a highest magnitude vector and determine a gain value to cause the highest magnitude vector to be approximately 1 g. The computer processor will assign the gain value to the axis with the highest magnitude vector, such that the gain value is applied to each measurement generated by the axis with the highest magnitude vector.

21 Claims, 7 Drawing Sheets

(51) Int. Cl.
  *B62J 45/41* (2020.01)
  *B62J 45/412* (2020.01)
  *B62J 45/414* (2020.01)
  *B62J 45/415* (2020.01)
  *G01P 15/00* (2006.01)

(52) U.S. Cl.
  CPC ....... B62J 45/4151 (2020.02); B62J 45/4152 (2020.02); B62J 45/41 (2020.02); *G01P 15/00* (2013.01)

(56) References Cited

U.S. PATENT DOCUMENTS

| | | | |
|---|---|---|---|
| 8,627,932 B2 | 1/2014 | Marking | |
| 8,838,335 B2 | 9/2014 | Bass et al. | |
| 8,857,580 B2 | 10/2014 | Marking | |
| 8,955,653 B2 | 2/2015 | Marking | |
| 9,026,263 B2 | 5/2015 | Hoshizaki | |
| 9,033,122 B2 | 5/2015 | Ericksen et al. | |
| 9,120,362 B2 | 9/2015 | Marking | |
| 9,239,090 B2 | 1/2016 | Marking et al. | |
| 9,303,712 B2 | 4/2016 | Cox | |
| 9,353,818 B2 | 5/2016 | Marking | |
| 9,452,654 B2 | 9/2016 | Ericksen et al. | |
| 9,623,716 B2 | 4/2017 | Cox | |
| 9,682,604 B2 | 6/2017 | Cox et al. | |
| 9,797,467 B2 | 10/2017 | Wootten et al. | |
| 9,958,473 B1* | 5/2018 | Sljivar | G01P 1/04 |
| 10,036,443 B2 | 7/2018 | Galasso et al. | |
| 10,040,329 B2 | 8/2018 | Ericksen et al. | |
| 10,047,817 B2 | 8/2018 | Ericksen et al. | |
| 10,060,499 B2 | 8/2018 | Ericksen et al. | |
| 10,415,662 B2 | 9/2019 | Marking | |
| 10,443,671 B2 | 10/2019 | Marking | |
| 10,737,546 B2 | 8/2020 | Tong | |
| 10,933,710 B2 | 3/2021 | Tong | |
| 2010/0276906 A1* | 11/2010 | Galasso | F16F 9/065 188/266.2 |
| 2015/0094977 A1* | 4/2015 | Dobra | G01P 15/00 702/104 |
| 2015/0224845 A1* | 8/2015 | Anderson | F03G 7/08 701/37 |
| 2015/0276975 A1 | 10/2015 | Carroll | |
| 2015/0305426 A1* | 10/2015 | Lee | A42B 3/046 340/539.12 |
| 2019/0016409 A1* | 1/2019 | Tetsuka | B62K 25/08 |
| 2019/0187172 A1* | 6/2019 | Thompson | G01C 25/00 |
| 2019/0265270 A1* | 8/2019 | Yamashita | G06F 3/01 |
| 2021/0330273 A1* | 10/2021 | Crawford | A61B 6/487 |

FOREIGN PATENT DOCUMENTS

| | | |
|---|---|---|
| CN | 105912850 B | 1/2019 |
| CN | 106530696 B | 7/2019 |
| EP | 0246772 A1 | 11/1987 |
| EP | 2130721 A1 | 12/2009 |
| EP | 2248691 A1 | 11/2010 |
| EP | 2567839 A2 | 3/2013 |
| EP | 4046833 A1 | 8/2022 |
| EP | 4046833 B1 | 7/2025 |
| JP | 2016134173 A | 7/2016 |
| TW | I343331 B | 6/2011 |
| TW | I367837 B | 7/2012 |
| TW | 201430781 A | 8/2014 |
| TW | 201700977 A | 1/2017 |
| TW | M546323 U | 8/2017 |
| TW | I823265 B | 11/2023 |
| TW | I893487 B | 8/2025 |

OTHER PUBLICATIONS

Taiwanese First Office Action, Application No. 111106424, 10 Pages, Mailed Aug. 31, 2022.
Taiwanese First Office Action, Application No. 112140012, 7 Pages, Mailed Jun. 6, 2024.

* cited by examiner

ORIENTATIONALLY FLEXIBLE BUMP SENSOR

CROSS-REFERENCE TO RELATED APPLICATIONS (PROVISIONAL)

This application claims priority to and benefit of U.S. Provisional Patent Application No. 63/152,668 filed on Feb. 23, 2021, entitled "FLEXIBLE MOUNTING OF WIRELESS LIVE VALVE BUMP SENSOR" by Ericksen et al., and assigned to the assignee of the present application, the disclosure of which is hereby incorporated by reference in its entirety.

FIELD OF THE INVENTION

Embodiments of the present technology relate generally to a bump sensor in a suspension system.

BACKGROUND

Vehicle suspension systems typically include a spring component or components and a damping component or components that form a suspension to provide for a comfortable ride, enhance performance of a vehicle, and the like. For example, a harder suspension is usually preferred on smooth terrain while a softer suspension is often the choice for an off-road environment. However, the suspension system is almost always a collection of compromises to obtain the "best" performance over a range of different possible encounters. Thus, as with every collection of compromises, an advancement in one area of a suspension system will often incur a new problem, set of problems, or performance changes/capabilities in another area. These performance changes, capabilities, and/or problems provide new and different opportunities for further suspension improvement and/or advancements thereby fueling an ongoing state of analysis, invention, and development.

BRIEF DESCRIPTION OF THE DRAWINGS

Aspects of the present invention are illustrated by way of example, and not by way of limitation, in the accompanying drawings, wherein.

Figure 1:
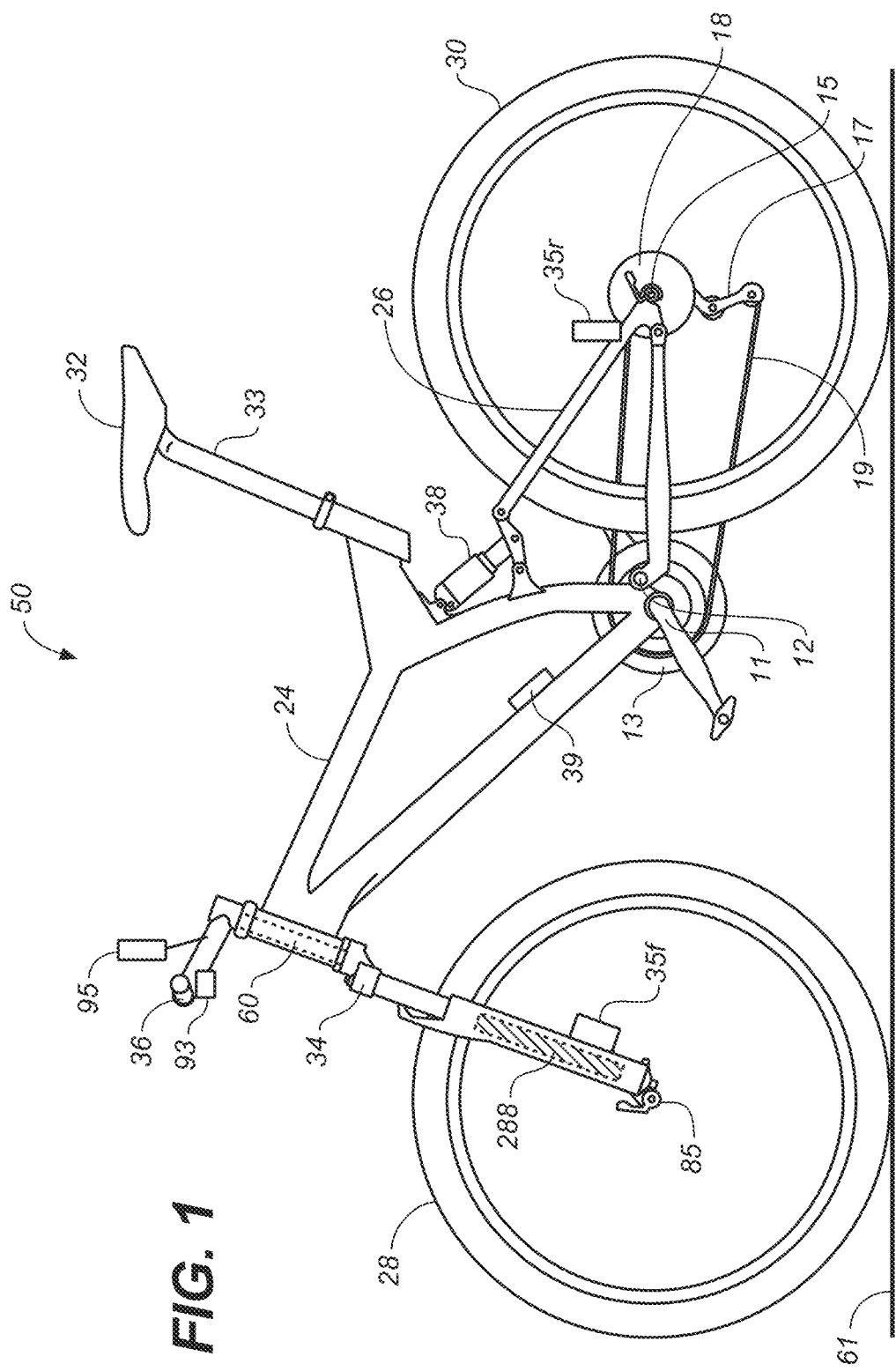
FIG. 1 is a schematic side view of a bicycle having a wireless active suspension system with a orientationally flexible bump sensor, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure In general, a suspension system for a vehicle provides a motion modifiable connection between a portion of the vehicle that is in contact with a surface and some or all of the rest of the vehicle that is not in contact with the surface. For example, the portion of the vehicle that is in contact with the surface can include one or more wheel(s), skis, tracks, hulls, etc., while some or all of the rest of the vehicle that is not in contact with the surface include suspended portions such as anything on a frame, a seat, handlebars, engines, cranks, etc.

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable.

In general, the term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

Additional information regarding SAG and SAG setup can be found in U.S. Pat. No. 8,838,335 which is incorporated by reference herein, in its entirety.

In the following discussion, and for purposes of clarity, a bicycle is utilized as the example vehicle. However, in another embodiment, the vehicle could be on any one of a variety of vehicles such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on- and/or off-road vehicle, an aircraft, or the like. In general, a motorized bicycle can include a bicycle with a combustion motor, an electric bicycle (e-bike), a hybrid electric and combustion bicycle, a hybrid motor and pedal powered bicycle, and the like.

Embodiments described herein provide a new and different system and method for using an orientationally flexible bump sensor in an active suspension system. One embodiment uses a sensor, or group of sensors, (e.g., an accelerometer, or the like, often referred to as a bump sensor) attached to an unsprung location in the front and/or rear of the vehicle that senses an event (e.g., a bump) encountered by the bicycle—essentially reading the terrain. In one embodiment, the initial orientation of the sensor with respect to the ground plane 61 does not need to be perfectly perpendicular as aspects disclosed herein provide the ability to adjust for any angular discrepancies.

In general, a bump sensor is used to identify an event, like a pothole on a road, or a rock or tree root on a trail that is encountered by a vehicle. During the encounter, there is a large spike in acceleration which is reported by the bump sensor to the suspension controller which then triggers an active valve in the suspension to switch the suspension to a softer (or even a softest) setting. For example, if the front wheel of a road bicycle hits a pothole, the large spike in acceleration is reported by the front bump sensor to the suspension controller which triggers an active valve in the suspension to switch the suspension to a softer (or even a softest) setting.

Embodiments described herein disclose an orientationally flexible bump sensor that reduce installation complexity by allowing the bump sensor to be installed in different locations and with different orientations and provides a post installation calibration process to identify and adjust the signal from the bump sensor, such that the output from the bump sensor is equivalent to a bump sensor that is mounted to a vehicle with at least one measuring axis perpendicular to the ground plane 61.

Referring now to FIG. 1, a schematic side view of a bicycle 50 having an orientationally flexible bump sensor is shown in accordance with an embodiment. In one embodiment, a ground plane 61 or relatively flat surface is shown as the surface upon which bicycle 50 would be approximately perpendicular to when it is in motion.

Bicycle 50 has a main frame 24 with a suspension system comprising a swing arm 26 that, in use, is able to move relative to the rest of main frame 24; this movement is permitted by, inter alia, active valve damper 38. The front fork 34 also provide a suspension function via a damping assembly 288 in at least one fork leg; as such the bicycle 50 is a full suspension bicycle (such as an ATB or mountain bike).

However, the embodiments described herein are not limited to use on full suspension bicycles. In particular, the term "suspension system" is intended to include vehicles having front suspension only, rear suspension only, seat suspension only, a combination of two or more different suspensions, and the like. In one embodiment, swing arm 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Bicycle 50 includes a front wheel 28, a rear wheel 30 and a seat 32. A seat 32 is connected to the main frame 24 via a seatpost 33 in order to support a rider of the bicycle 50.

The front wheel 28 is coupled with front fork 34 via axle 85. The front fork 34 includes a crown and at least one fork leg. Above the crown, a steerer tube 60 passes through a portion of bicycle main frame 24 and attaches the fork 34 to the handlebars 36 (via a stem) allowing the rider to steer the bicycle 50. In one embodiment, at least one active valve damper 288 is integrated with fork 34.

The rear wheel 30 is connected to the swing arm 26 of the frame 22 at rear axle 15. A rear damping assembly (e.g., active valve damper 38) is positioned between the swing arm 26 and the frame 22 to provide resistance to the pivoting motion of the swing arm 26 about pivot point 12. Thus, the illustrated bicycle 50 includes a suspension member between swing arm 26 and the main frame 24 which operate to substantially reduce rear wheel 30 impact forces from being transmitted to the seat 32 (and thus the rider) of the bicycle 50.

In general, the active suspension components such as, but not limited to, active valve damper 288 and/or active valve damper 38, are coupled with the wheels, seats, handlebars, or the like, and are used to reduce an initial force generated by an event (e.g., imparted to a wheel of the vehicle from the surface on (or through) which the vehicle is traveling) to a lesser force as it is transferred to the rest of the vehicle and/or persons riding therein/thereon.

Bicycle 50 is driven by a chain 19 that is coupled with both front sprocket assembly 13 and rear sprocket 18. As the rider pedals the bicycle, the front sprocket assembly 13 is rotated about bottom bracket axis 11 and a force is applied to chain 19 which transfers the energy from the front sprocket assembly 13 to rear sprocket 18. Chain tension device 17 provides a variable amount of tension on chain 19. The need for chain 19 length variation can be due to a number of different gears that may be on one or both of front sprocket assembly 13 and/or rear sprocket 18 and/or changes in chain stay length as the distance between bottom bracket axis 11 (where front sprocket assembly 13 attaches to main frame 24) and the rear axle 15 changes due to suspension articulation.

Figure 2:
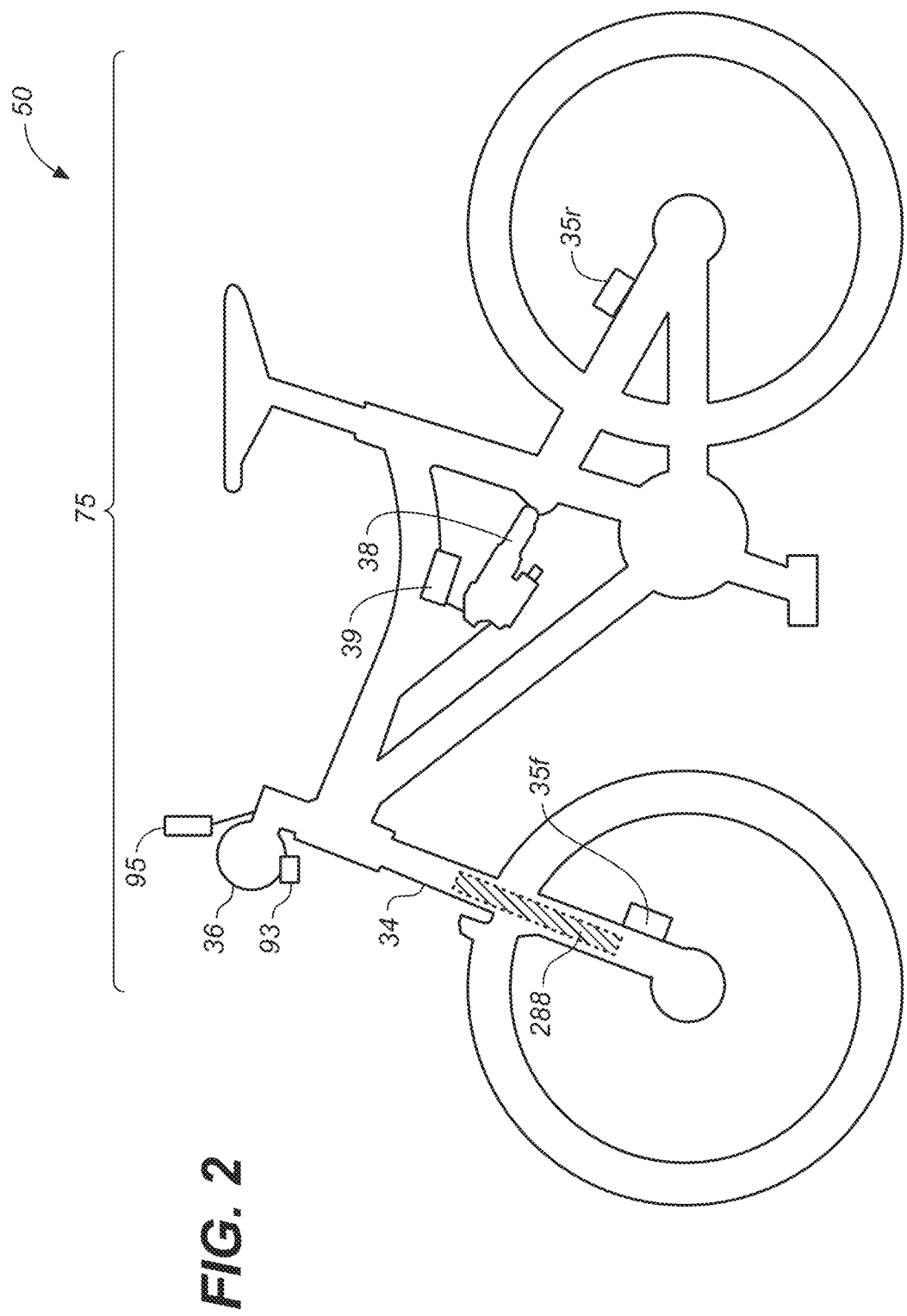
FIG. 2 is a schematic side view of a bicycle with a wireless active suspension system and orientationally flexible bump sensor, in accordance with an embodiment.
Figure 3:
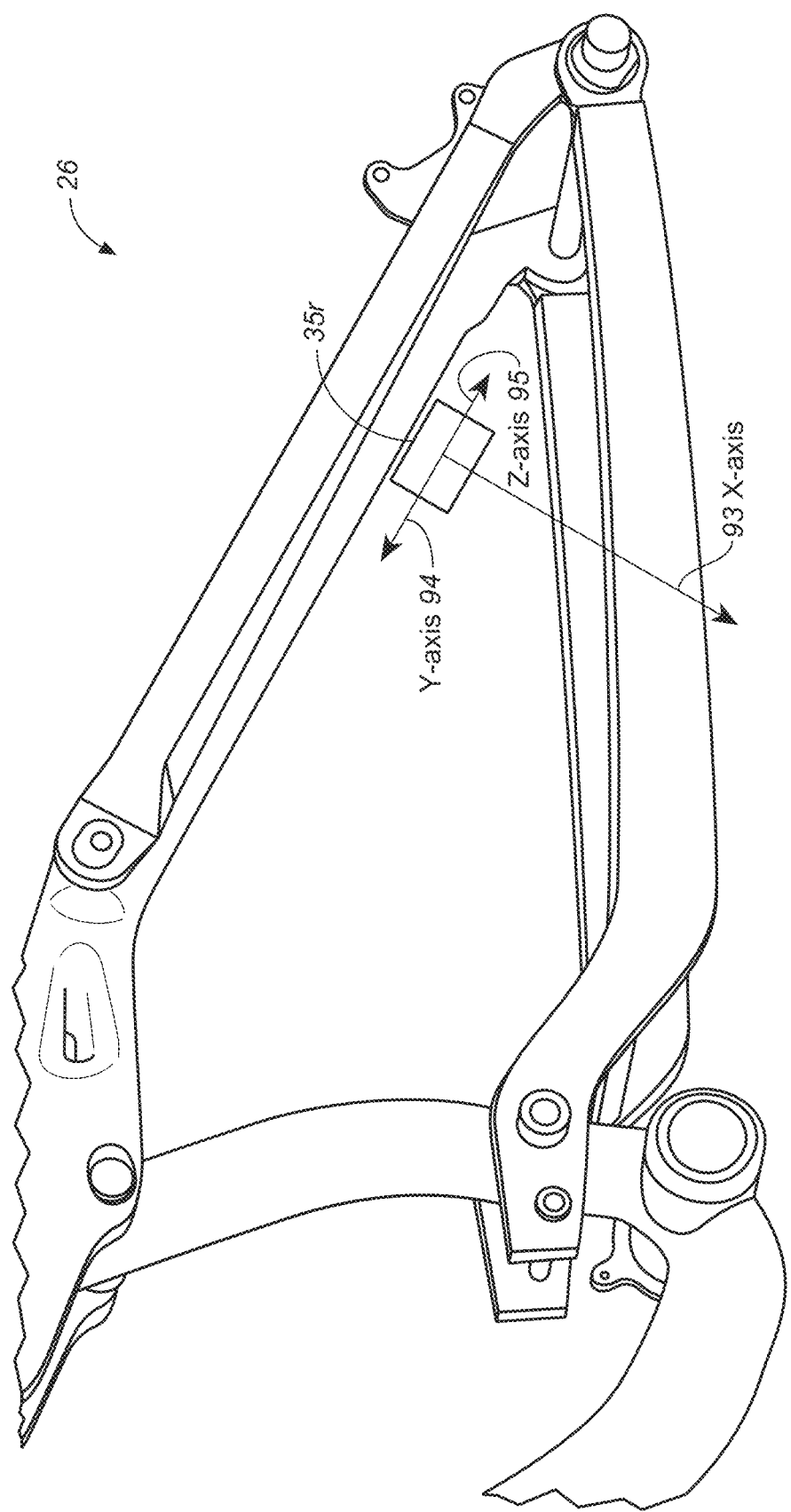
FIG. 3 is a perspective view of a swingarm having a wireless sensor mounted therewith, in accordance with an embodiment.
Figure 4:
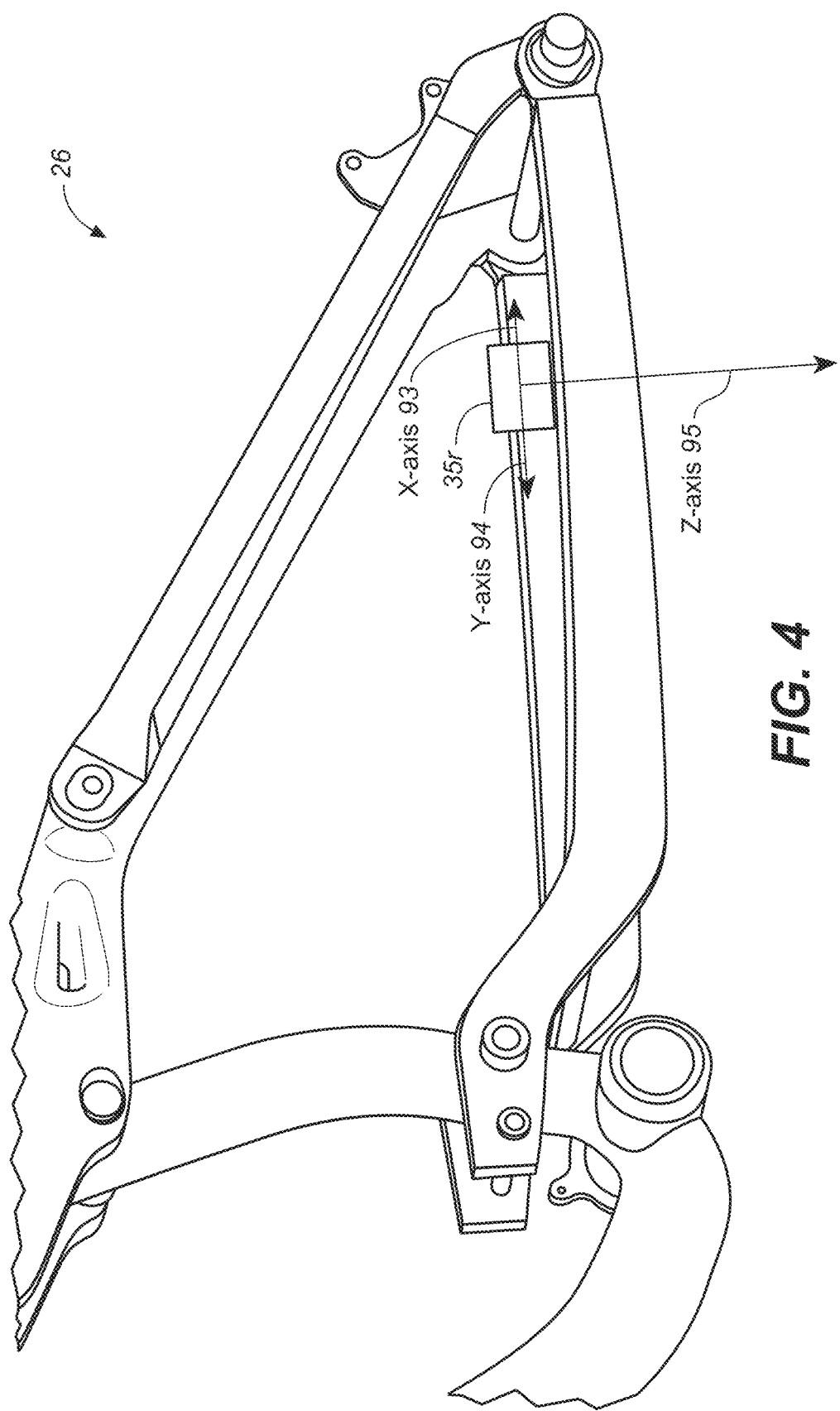
FIG. 4 is a perspective view of a swingarm having a wireless sensor mounted in a different location therewith, in accordance with an embodiment.

In one embodiment, bicycle 50 includes an active suspension system consisting of a suspension controller 39, one or more sensors (e.g., orientationally flexible bump sensor 35*f*, 35*r*, and the like), smart components, mobile device 95, active valve dampers (e.g., active damper 38, active damper 288, a seat post damper, etc.), and the like. In one embodiment, sensor 35*r* is positioned on the swing arm 26 the rear axle 15 of bicycle 50. In one embodiment, sensor 35*f* is positioned in an unsprung location of front fork 34. Further discussion of the active suspension system with orientationally flexible bump sensor is shown in FIGS. 2-4 and is provided in the discussion of FIGS. 2-4 herein.

In one embodiment, mobile device 95 is mounted to handlebar assembly 36 of bicycle 50. Although mobile device 95 is shown mounted to handlebar assembly 36, it should be appreciated that the mobile device 95 could be in a rider's backpack, pocket, or the like. In general, mobile device 95 is a smart device such as a mobile phone, a smart phone, a tablet, a smart watch, a piece of smart jewelry, smart glasses, or other user portable device(s) having wireless connectivity. Mobile device 95 is capable of broadcasting and receiving via at least one network, such as, but not limited to, WiFi, Cellular, Bluetooth, NFC, and the like. In one embodiment, mobile device 95 includes one or more of a display, a processor, a memory, a GPS, a camera, and one or more sensors such as audio, visual, motion, acceleration, altitude, and the like.

In one embodiment, switch 93 is mounted to handlebar assembly 36 of bicycle 50. In one embodiment, switch 93 is a positional switch used in conjunction with the active suspension system with orientationally flexible bump sensor 35. In one embodiment, switch 93 is a multi-positional switch, an upshift/downshift type of switch, a button type switch, or the like. For example, switch 93 would be a 2-position switch, a 3-position switch, a switch that can cycle through a number of different modes (similar to a gear shift), or the like. Although switch 93 is shown mounted to handlebar assembly 36, it should be appreciated that switch 93 could be mounted in a different location on the vehicle, on a mount coupled to the vehicle, or the like. In one embodiment, the location of switch 93 is modifiable and is located on the vehicle based on a user's preference.

In one embodiment, one or a plurality of component(s) of the bicycle 50 are also smart component(s). Examples of the smart component(s) can include one or more of the forks, wheels, rear shocks, front shocks, handlebars, seat posts, pedals, cranks, and the like. In one embodiment, the smart component(s) will include connective features that allow them to communicate wired or wirelessly with one or more of suspension controller 39, mobile device 95, one or more sensors 35, and/or any other smart component(s) within transmission range (thereby becoming connected components).

In one embodiment, data (including real-time data) is collected or provided from the smart component to the suspension controller 39. Depending upon the connected component, data such as telemetry attributes to provide angle, orientation, velocity, acceleration, RPM, operating temperature, and the like, can be obtained.

Referring now to FIG. 2, a schematic side view of a bicycle 50 with focus on the active suspension system 75 with orientationally flexible bump sensor is shown in accordance with an embodiment.

In one embodiment, active suspension system 75 with orientationally flexible bump sensor includes suspension controller 39, one or more sensors (e.g., sensor 35*f*, 35*r*, and the like), hereinafter "sensor 35", smart components, mobile device 95, active valve dampers (e.g., active damper 38, active damper 288, a seat post damper, etc.), or the like.

In general, sensor 35 could be a single sensor (such as an accelerometer) or a combination of sensor types. Sensor 35 is used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable.

In one embodiment, sensor 35 is a force or acceleration transducer (e.g., strain gage, Wheatstone bridge, accelerometer, hydraulic, interferometer based, optical, thermal or any suitable combination thereof). Further, the sensor 35 may utilize solid state electronics, electro-mechanical principles or MEMS, or any other suitable mechanisms.

In one embodiment, one, some, or all of the components discussed herein including switch 93, sensor 35*f*, sensor 35*r*, suspension controller 39, active valves, mobile device 95, and the like are wired and/or wireless and communicate with one or more of the other components of active suspension system with orientationally flexible bump sensor via a wireless personal area network (WPAN), a low power network (LPAN), Internet of things (IoT) connectivity, or the like. In one embodiment, communication protocol could be, but is not limited to, Bluetooth, WiFi, Bluetooth Low Energy (BLE), near field communication (NFC), UHF radio signal, Worldwide Interoperability for Microwave Access (WiMax), long-term evolution (LTE), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

In one embodiment, one, some, or all of the components discussed herein including switch 93, sensor 35*f*, sensor 35*r*, suspension controller 39, active valves, mobile device 95, and the like, could form a wireless mesh, such as a bicycle area network (BAN) or the like. In one embodiment, one or more components of the BAN could interact with the user/rider in any number of ways such as via touch, sound, vision, radio, wearable, and the like.

In one embodiment, the components within the wireless mesh may include an auxiliary or propriety private network encryption. In one embodiment, one or more components within the wireless mesh may include communication protocols for one or more peers, such as an out-of-BAN wireless device that doesn't want to share its network. In this case, the out-of-BAN wireless device can provide a hardware interface and it can be piped into the BAN. Thus, in one embodiment, the wireless mesh network can be used to connect and/or control almost any wireless aspect, as the network, topology, and features thereof are well suited to interacting with basic device operating structures.

In one embodiment, the sensors 35 of active suspension system 75 with orientationally flexible bump sensor provide the obtained sensor data to a suspension controller 39 which uses the sensor data to make suspension adjustments. In one embodiment, suspension controller 39 makes suspension adjustments to active valve damper 38, active valve damper 288, or the like.

In one embodiment, location data from a position system is used in conjunction with terrain data to determine probability of obstacles is used to provide a priori knowledge to optimize suspension configuration. For example, GPS location information and a terrain database (or the like) is used to establish the bicycle's current location and the terrain about the location (e.g., on a bumpy patch of trail, etc.).

In one embodiment, suspension controller 39 monitors the sensor(s) 35 for sensor input (and/or the location and terrain data, etc.) and make suspension adjustments in a matter of milliseconds after receiving the sensor data. For example, in one embodiment, sensors on the fork, rear axle, and/or main frame read bump input at the wheel and send the obtained sensor data to the suspension controller 39. Thus, by placing sensors on the frame and/or in unsprung location for both wheels, the suspension controller 39 processes data from the terrain to constantly adjust the suspension for maximum efficiency and control. In one embodiment, suspension controller 39 includes a power source such as a lithium-ion battery or the like. In one embodiment, the power source for suspension controller 39 is charged wired or wirelessly while either on or off the bicycle.

In general, the one or more sensors may be attached to the swing arm 26 directly, to any link thereof, to an intermediate mounting member, to front fork 34, to active valve damper 38, seat 32, handlebar assembly 36, or to any other portion or portions of the bicycle 50 as may be useful, available, or the like. In one embodiment, one or more sensors and valve actuators (e.g. electric solenoid or linear motor type—note that a rotary motor may also be used with a rotary actuated valve), suspension components, suspension component controller(s) and/or data processing system(s), and the like may be coupled to and/or integrated with the vehicle structure, such as disclosed in U.S. Pat. Nos. 7,484,603; 8,838,335; 8,955,653; 9,303,712; 10,036,443; 10,060,499; 10,443,671; and 10,737,546; the content of which is incorporated by reference herein, in its entirety. Further, sensors and valves, or principles, of patents and other documents incorporated herein by reference, may be integrated one or more embodiments hereof, individually or in combination.

Although a number of sensors are shown in FIG. 2, it should be appreciated that there may be only a single sensor or two or more sensors in operation. Moreover, in one embodiment, mobile device 95 is part of the active suspension system 75 with orientationally flexible bump sensor.

With reference now to FIG. 3, a perspective view of a swingarm 26 having a sensor 35 mounted therewith is shown in accordance with an embodiment. As stated herein, the sensor 35 can be mounted anywhere on the swingarm (or another portion of the vehicle). However, in one embodiment, the sensor 35 is mounted to the underneath of the seatstay of the swingarm 24 of bicycle 50. In one embodiment, the wireless sensor 35 is an accelerometer type sensor that reads acceleration in three axis, e.g., X-axis 93, Y-axis 94, and the Z-axis 95.

In one embodiment, before the sensor is calibrated, the vehicle is positioned such that it is on relatively flat ground and is relatively straight up and down (e.g., the vehicle is oriented basically perpendicular to the flat ground plane). Once the vehicle is properly positioned, the sensor 35 is set to a calibration sequence. In one embodiment, during the calibration sequence, the three acceleration readings (e.g., readings from X-axis 93, Y-axis 94, and the Z-axis 95) are evaluated, and the axis with the highest magnitude gravity vector is identified. For example, in one mounting location, such as shown in FIG. 3, the sensor 35 is orientated such that the X-axis 93 gravity vector is 0.7 g, the Y-axis 94 gravity vector is 0.2 g and the Z-axis 95 gravity vector is 0.1 g, this would mean that none of the X-axis 93, Y-axis 94, or the Z-axis 95 are aligned with the gravity vector (e.g., 1 g). However, the X-axis 93 would be the dominant axis, e.g., the axis identified as having the highest magnitude gravity vector.

In one embodiment, this identified axis (e.g., the X-axis 93 in this example) will be the axis (or signal) that will be designated to be monitored as the bump sensor signal. In other words, the signal designated by the X-axis 93 has the highest magnitude gravity vector value. As such, in one embodiment, the X-axis 93 is designated as the bump sensing axis.

In one embodiment, once the X-axis 93 is determined as the designated bump sensing axis, a gain is applied to the signal from the X-axis 93 to bring the gravity vector to 1 g. An example of the gain calculation could be absolute value (max sensor axis reading)*gain=1 g. In this example, the gain calculation would be abs(X-axis 93)*gain=1 g so the substitution for X-axis 93 would result in: abs(0.7 g)*gain=1 g. Solving for the gain=1 g/abs(0.7 g)=0.42. Thus, in the embodiment of FIG. 3, since the X-axis 93 reads 0.7 g, the signal will be gained by 42% to bring it to 1 g. Once the evaluation is performed, the appropriate axis identified, and the gain value determined, the sensor 35r is moved from calibration mode to operational mode and the X-axis 93 will provide the bump sensor information. Moreover, once the calibration is completed, the gain value will remain fixed until the next time the sensor is put into the calibration mode.

In one embodiment, if two of the axis gravity vectors are the same, e.g., the X-axis 93 gravity vector is 0.5 g and the Y-axis 94 gravity vector is 0.5 g, then either of the X-axis 93 or the Y-axis 94 may be selected as the dominant axis.

Referring now to FIG. 4, a perspective view of a swingarm 26 having a sensor 35r mounted in a different location therewith is shown in accordance with an embodiment. For example, the sensor 35r is mounted to the top of the chainstay portion of the swingarm 26. In one embodiment, during the evaluation of the three axis signals, the signal designated by the Z-axis 95 is determined to have the highest magnitude gravity vector value. For example, during calibration, the Z-axis 95 had the highest reading of 0.85 g. As such, the Z-axis 95 is selected as the bump sensing axis.

Once the Z-axis 95 is selected, the gain is then calculated to bring the sensor 35r reading to 1 g. In this example, since the Z-axis 95 reads 0.85 g, the signal will be gained by 18% to bring it to 1 g (gain=1 g/abs(0.85)=18%). Once the evaluation is performed, the appropriate axis identified, and the gain value determined, the sensor 35r is moved from the calibration mode to an operational mode and the Z-axis 95 will provide the bump sensor information. In one embodiment, once the calibration is completed, the gain value for the dominant axis will remain fixed until the next time the sensor is put into the calibration mode.

Although two examples, are shown, it should be appreciated that in other embodiments, the sensor could be coupled or mounted at another location along the swingarm 26. In one embodiment, the location of the sensor could be based upon an amount of protection provided to the sensor. For example, while it could be mounted to the bottom of the chainstay of the bicycle, this would, in one embodiment, provide less protection for the sensor as the vehicle traverses the terrain.

In one embodiment, a similar calibration, dominant axis identification, and gain determination is performed on another bump sensor 35 on the vehicle, for only the wireless bump sensors 35 on a vehicle, for all the bump sensors 35 on a vehicle, or the like. For example, in addition to the rear bump sensor 35r, there may be a front bump sensor 35f at the front of the vehicle, such as shown in FIG. 1. Thus, in one embodiment, the calibration, dominant axis identification, and gain determination is performed on both the front bump sensor 35f and the rear bump sensor 35r.

In one embodiment, the the sensor is a wired sensor (e.g., has a wired communication connection with the suspension controller 39). In one embodiment, if the sensor is a digital sensor (e.g., the sensor includes a microprocessor such that more than one channel can be selectively passed along the wire to the suspension controller 39), the same calibration, dominant axis identification, and gain determination can be performed on the digital wired sensor 35.

In one embodiment, if the wired sensor is an analog sensor 35 (e.g., without a microprocessor), then only the information from the axis wired to communicate with the suspension controller 39 can be received by the suspension controller 39. In one embodiment, the analog sensor could still partake in the calibration process, except instead of identifying the dominant axis, the dominant axis would be the axis that is providing the bump sensor signal to suspension controller 39. Then, as above, the magnitude gravity vector value of the predefined axis would be evaluated, the gain would be calculated and the resulting gain value would be used to make the bump sensor signal 1 g.

Once the evaluation is performed and the gain value determined, the analog sensor is moved from the calibration mode to an operational mode and be prepared to provide the bump sensor information. In one embodiment, once the calibration is completed, the gain value for the reporting axis will remain fixed until the next time the sensor is put into the calibration mode. In one embodiment, since the analog sensor does not have a microprocessor, the gain value determination is performed by another device, such as the suspension controller 39, the mobile device 95, etc. In one embodiment, since the analog sensor does not have a microprocessor, the gain could be applied to the signal via the suspension controller 39.

Thus, by using the calibration, evaluation, and gain value determination, the placement of the analog sensor 35 can be less stringent. In other words, by performing the recited process, even the analog sensor placement can be modified while the values provided by the bump sensor during vehicle operation will be gained to provide the same (or similar) results as if the sensor were placed such that one axis was perpendicular to the ground plane.

In one embodiment, a similar calibration, evaluation, and gain value determination can be used on a two-axis sensor. In one embodiment, a similar calibration, evaluation, and gain value determination can be used on a single axis sensor. In one embodiment, a similar calibration, evaluation, and gain value determination can be used on a sensor having any number of axes.

Figure 5:
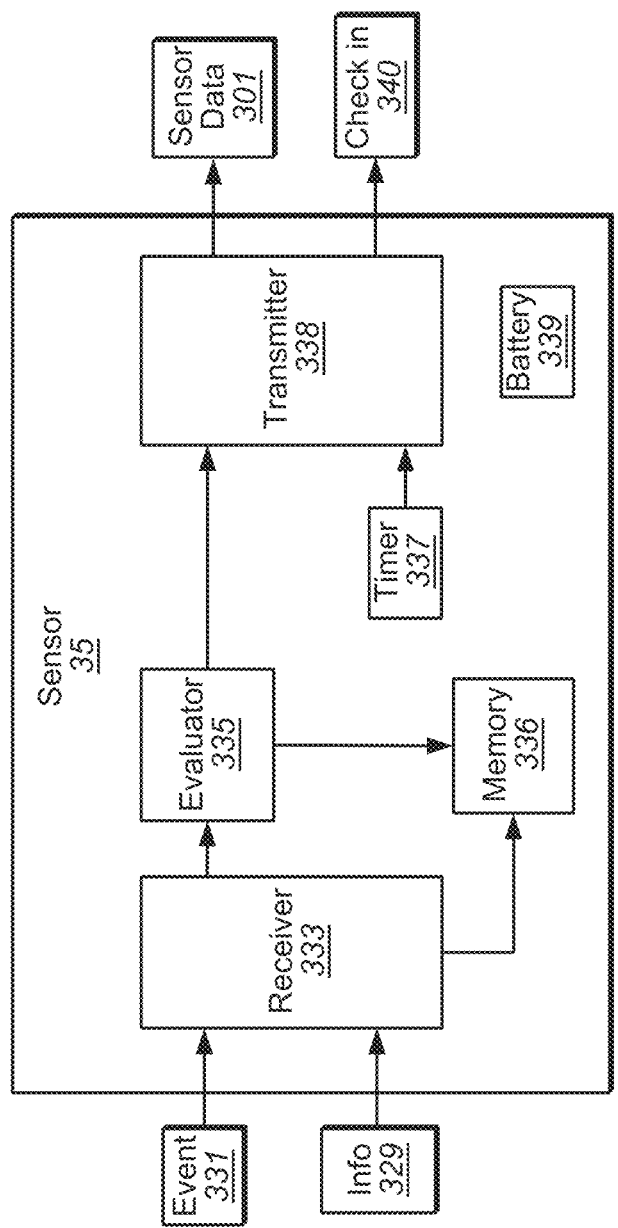
FIG. 5 is a block diagram of a sensor, shown in accordance with an embodiment.

With reference now to FIG. 5, a block diagram of a sensor 35 is shown in accordance with an embodiment. As discussed herein, in one embodiment, the bicycle 50 has bump sensor 35 on the front and rear unsprung masses that communicate to a suspension controller 39. Although in one embodiment, the sensors are bump sensors, in one embodiment they could be any type of sensors such as one or more of those disclosed herein. In one embodiment, the sensors are wireless. In one embodiment, the sensors are wired. In one embodiment, the sensors on the vehicle may be a combination of wired and wireless.

In one embodiment, sensor 35 includes a receiver 333, an evaluator 335, a memory 336, a transmitter 338, a timer 337, and a power source 339. In one embodiment, the acceleration (or other force) identified by an event 331 is analyzed locally at the sensor 35.

In one embodiment, sensor 35 generates data based on an event 331, receives information 329 from suspension controller 39, and outputs sensor data 301 message and check-in message 340.

In one embodiment, a power source for sensor 35 is a CR2032 battery. In one embodiment, power source is a different type of non-rechargeable battery. In one embodiment, the power source is a rechargeable battery. In one embodiment, the power source can be recharged wired or wirelessly. For example, a power source having a wirelessly rechargeable capability means it could be charged using a wireless power transfer system. E.g., using an inductive charger (or the like) within a given distance of the wirelessly rechargeable capability of the battery. Examples of a wireless power transfer systems that could be used in one or more embodiments include those defined by the wireless power consortium (WPC) Qi standard, the AirFuel Alliance (e.g., Duracell Powermat, PowerKiss, etc.), WiTricity, and the like.

In one embodiment, the power source is an energy harvesting switch that does not require a battery or other powered connection. As such, the energy harvesting switch is capable of operating for an indefinite amount of time without requiring any type of recharge, battery change, etc. For example, in one embodiment, the energy harvesting switch utilizes a momentary generator such as ZF electronics AFIG-0007 to provide power.

In one embodiment, sensor data 301 broadcast by sensor 35 includes a unique identifier (ID) that identifies the specific sensor that broadcast the sensor data 301. Thus, even when a number of different sensors are operating in the same environment, the suspension controller 39 will be able to identify which sensor 35 sent the signal based on the unique ID. In one embodiment, the unique ID is used during the programming/pairing of sensor 35 with suspension controller 39.

In one embodiment, the unique ID is used by suspension controller 39 to identify a valid sensor 35, and the event information in sensor data is used by suspension controller 39 to identify the associated action to be taken. Although a unique ID is used in one embodiment, in another embodiment, a different identification methodology may be used to identify the sensor 35 and/or the associated action to be taken.

In general, the one or more sensor(s) 35 transmit sensor data input 301 when an event is identified, as part of a cycle (e.g., a heartbeat check-in, etc.), as a radio event, or the like.

In one embodiment, the sensor data 301 could be data transmitted over the wireless mesh at a predetermined and/or dynamic interval. Moreover, in one embodiment, the transmission type, transmitted information, and/or transmission rate of sensor data 301 over a regular or a wireless mesh network could be based upon connected low-power and/or high precision sensors that may/or may not include additional microprocessors, and the like.

For example, in one embodiment, the wireless network is an intra-vehicle wireless network (such as a BAN) for data transmission between at least two components coupled with the vehicle, the at least two components including, but not limited to, at least one sensor, the suspension controller, and at least one peripheral device (such as a smart component, switch, or the like) coupled with the vehicle. In one embodiment, the intra-vehicle wireless network is a wireless mesh network. In one embodiment, the intra-vehicle wireless network includes an intra-vehicle transmission authentication and encryption protocol.

In one embodiment, the information or data (e.g., message payload) provided in sensor data 301 will include additional information/data comprising the wireless network which is passed to and from peripheral devices in the network. Thus, in one embodiment, the wireless network communication and/or wireless mesh network will allow for information/data to be exchanged between adjacent vehicles, vehicle networks, etc. as described herein.

In one embodiment, the wireless network includes an inter-vehicle communication (IVC) wireless network for data transmission between the vehicle and at least another vehicle, between the vehicle and a mobile communications device distinct from the vehicle, between the vehicle and an infrastructure component (such as a traffic light, beacon on a stop sign, road mile marker, a benchmark, or the like). In one embodiment, the IVC wireless network is a wireless mesh network. In one embodiment, the IVC wireless network includes an IVC transmission authentication and encryption protocol.

In one embodiment, the IVC transmission authentication and encryption protocol is distinct and different from the intra-vehicle transmission authentication and encryption protocol, such that a device receiving a communication can determine the origin of the communication. In one embodiment, the origin of the communication is important depending upon the data provided in the communication. For example, a transmission that includes sensor provided information might only be verified and acted upon if it includes the intra-vehicle transmission authentication and encryption protocol (such as for security purposes discussed herein).

In one embodiment, the IVC transmission authentication and encryption protocol can include levels of trust. For example, a vehicle used by a friend may have a "trusted" IVC transmission authentication and encryption protocol that allows a sensor from the friend's vehicle to provide sensor data to the user's suspension controller that is verified and acted upon as sensor data from a "trusted" peripheral. In contrast, when an IVC transmission includes sensor provided information but it does not have a "trusted" IVC transmission authentication and encryption protocol it would not be verified and acted upon. However, other information such as stop sign warnings, terrain changing information, or the like from IVC transmissions would be evaluated by the suspension controller and may be used depending upon context, or the like.

In one embodiment, the sensor can be in a number of different states to conserve battery life. In an operating state, the sensor 35 is operating at its highest battery power consumption state. In a standby state, sensor 35 determines that there is a communications interruption with respect to suspension controller 39 (e.g., it is turned off or otherwise not responding), as such, sensor 35 will enter an intermediate battery power consumption state. In one embodiment, once in standby state, sensor 35 will not move to operating state until a connection with suspension controller 39 is established.

In one embodiment, when in standby state, sensor 35 will try to connect with suspension controller 39 at predefined times such as when a timer determines that it is time to send a heartbeat to suspension controller 39. In one embodiment, when in standby state, sensor 35 will try to connect with suspension controller 39 each time an event (or event above a predefined threshold) occurs and also try to connect with suspension controller 39 at predefined times such as when it is time to send a heartbeat to suspension controller 39.

In one embodiment, sensor 35 will remain in standby state until the connection with suspension controller 39 is established, or until sensor 35 determines there is a lack of movement. In one embodiment, if sensor 35 determines that the connection with suspension controller 39 is established (or re-established), sensor 35 will transition from standby state to an active state.

In one embodiment, if sensor 35 determines there is a lack of movement, sensor 35 will transition from standby state to a dormant state. In a dormant state, the bicycle is stationary and the sensor(s) 35 are reading no accelerations, e.g., a lack of movement. For instance, the bicycle is in storage or otherwise parked and not being ridden. In one embodiment, when in dormant state, the sensor(s) 35 go into low-power mode. In one embodiment, while in dormant state, the sensor 35 will periodically wake up to check for accelerations (e.g., the bicycle is being ridden) or movement. If there is a lack of movement (or accelerations), sensor 35 will return to the dormant state, e.g., go back to sleep. However, if the sensor 35 determines that there is movement (or accelerations) during the periodic wakeup, sensor 35 will change from the dormant state into either the standby state or the active state.

Thus, in one embodiment, sensor 35 can move between the different states fluidly. In one embodiment, depending upon the user settings, preferences, battery life requirements, or the like, sensor 35 will try to remain in (or return to) the lowest powered state for the specific situation.

Figure 6:
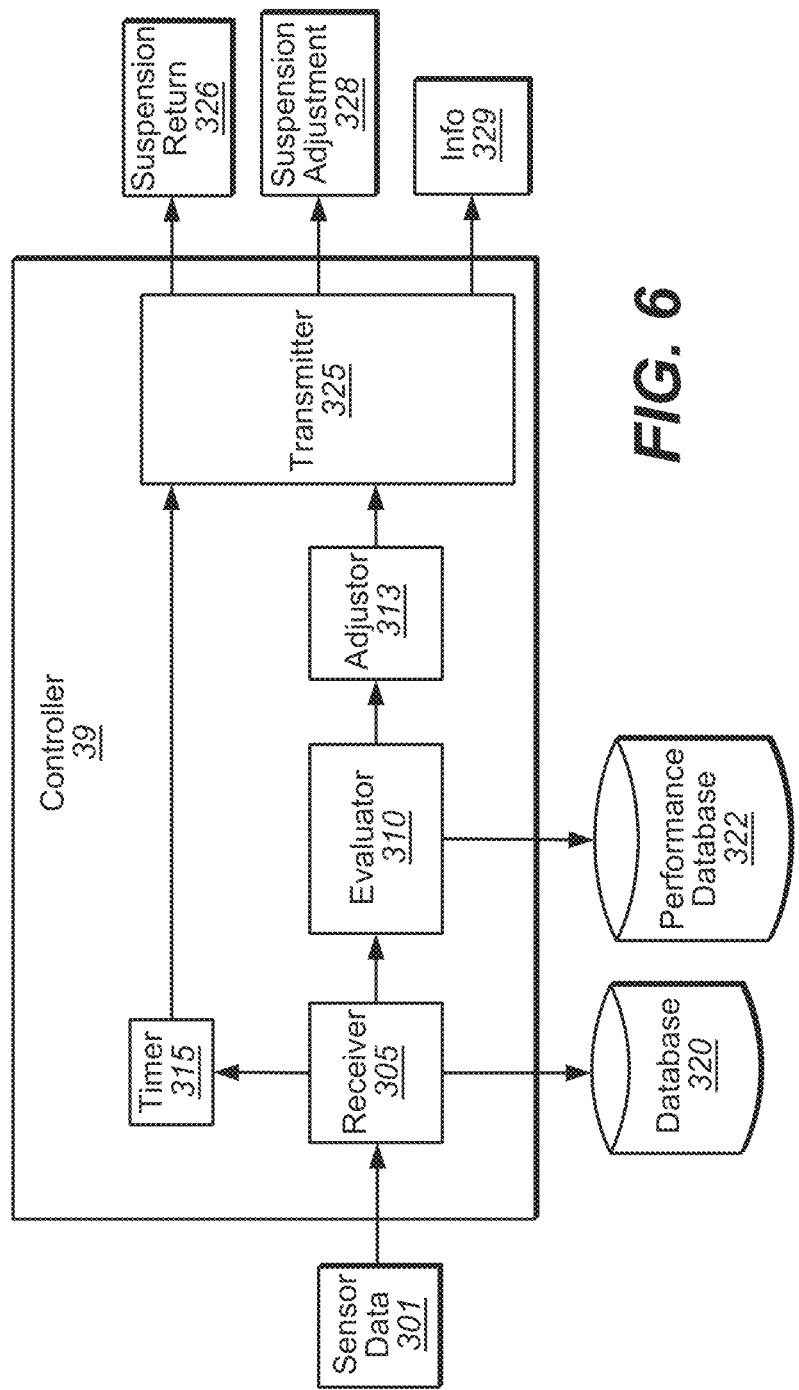
FIG. 6 is a block diagram of a suspension controller, shown in accordance with an embodiment.

Referring now to FIG. 6, a block diagram of a suspension controller 39 is shown in accordance with an embodiment. In one embodiment, suspension controller 39 includes a sensor data receiver 305, a sensor data evaluator 310, an active valve damper adjustor 313, a transmitter 325, and a timer 315.

In one embodiment, suspension controller 39 will use sensor data to generate suspension adjustments for damping assemblies via one or more of the active valves. For example, the active valve in the damper assembly 288 (or the active valve in the damper assembly 38) will receive a signal from suspension controller 39 to adjust one or more flow paths to modify the damping characteristics of the damper. Additional information for vehicle suspension systems, sensors, and their components as well as adjustment, modification, and/or replacement aspects including manually, semi-actively, and/or actively controlled aspects and wired or wireless control thereof is provided in U.S. Pat. Nos. 9,353,818; 9,682,604; 9,797,467; 10,415,662; the content of which are incorporated by reference herein, in their entirety.

In one embodiment, suspension controller 39 can also communicate wired or wirelessly with other devices such as another suspension controller, a mobile device, a computing system, and/or any other smart component(s) within a transmission range of suspension controller 39. For example, in one embodiment, suspension controller 39 could communicate with a suspension controller on a second vehicle, or any number of suspension controllers on any number of vehicles within range of suspension controller 39.

For example, if two riders are riding two bicycles within a communication range of the suspension controllers, one or more suspension controllers on each of the bicycles could be communicating wirelessly such that the suspension information from the lead bike is also provided to the follow bicycle(s) (or automobiles, motorcycles, ATVs, snowmobiles, water vehicles, and the like). In so doing, the suspension information from the lead vehicle can be used as future suspension information to the follow vehicle(s). In other words, the front vehicle information is provided to the follow vehicle(s) a short time prior to the follow vehicle(s) actually reaching the location of the suspension event (or terrain, etc.) that the front vehicle has already encountered. This would allow a suspension controller 39 on a follow vehicle to use the active valve adjustment to prepare the damper for the upcoming terrain or event.

In one embodiment, suspension controller 39 could have different modes such as open, auto, and lock out (different levels of bump sensing, or some combination thereof). The lock out mode would be a "sprint" type setting that would lock-out the suspension, providing no bump sensing and removing the opportunity for pedal bob.

In an open mode embodiment, the suspension would be a softer suspension that does not use any (or uses only limited bump sensing for the most major of suspension events). In the auto mode, the suspension controller 39 would operate in the "best" configuration. Such a "best" configuration could be based on terrain, rider, riding style, bicycle type, ride length, ride purpose, etc. For example, a "best" mode for a downhill mountain bike race would be a very active suspension configuration with a large range of motion, a "best" mode for a street race would be a firm suspension configuration with a very small range of motion, a "best" mode for a Sunday afternoon street ride would be a soft suspension configuration, etc. Although three suspension modes are discussed, in one embodiment, suspension controller 39 may have more or fewer modes, or operate with more or less granularity.

In one embodiment, the information from suspension controller 39 is displayed on a graphical user interface (GUI) and/or human machine interface (HMI) such as an infotainment system HMI/GUI (e.g., in-vehicle infotainment (IVI) system, mobile device 95, or the like). Further discussion and examples of an IVI control system and componentry are described in U.S. Pat. No. 10,933,710, the content of which is incorporated by reference herein, in its entirety.

In one embodiment, the IVI system may be integrated with the vehicle structure, suspension components, suspension controller(s) and data processing system as described in U.S. Pat. Nos. 7,484,603; 8,838,335; 8,955,653; 9,303,712; 10,060,499; 10,443,671; and 10,737,546; the content of each of which are incorporated by reference herein, in their entirety. In one embodiment, the IVI system could incorporate vehicle systems consisting of one or more sensor(s), imagers, active valves, active damping components, suspension controllers and the like. The principles of patents and other documents incorporated herein by reference, may be integrated one or more embodiments hereof, individually or in combination, as disclosed herein.

In one embodiment, suspension controller 39 receives sensor data input 301 from one or more sensor(s) 35 and outputs a suspension adjustment command 328, a suspension return command 326, and information 329.

In one embodiment, sensor data receiver 305 receives sensor data 301 from the one or more sensor(s) 35 (shown and described at least in FIGS. 1-4). In one embodiment, sensor data receiver 305 utilizes database 320 (or other memory solution) to collect and store the received sensor data 301.

In one embodiment, evaluator 310 determines a value of the event identified in the sensor data, and obtains a damper setting change for at least one damping characteristic of the active valve damper related to the event value. In one embodiment, the damper setting changes for at least one damping characteristic of the active valve damper are stored in performance database 322.

For example, in one embodiment, suspension controller 39 can evaluate what task should be performed upon receipt of sensor data 301 from the sensor 35 by using evaluator 310 and information stored in performance database 322 to evaluate the event value and perform any of a number of tasks based upon the evaluation. For example, sensor data 301 could cause suspension controller 39 to perform a task such as, but not limited to, firm up the suspension, soften the suspension, set the suspension to a predefined mapping (or suspension setup), or the like.

In one embodiment, depending upon the magnitude of the event, the receipt of sensor data 301 would cause suspension controller 39 to instantly (or nearly instantly) soften the active suspension of one or more of the active dampers. For example, if the vehicle is about to, or is encountering an event such as a rock, root, bump, curb, pothole, or the like that causes a force above a certain threshold to be felt at the tire (such as the front tire) sensor data 301 would describe an event which identifies as an event that suspension controller 39 should respond to by changing one or more active dampers into a softer mode (e.g., active damper 288) such that the force imparted by the event would be reduced before it is felt at the handlebars (or the seat, pedals, etc.).

In one embodiment, depending upon the magnitude of the event, the receipt of sensor data 301 would cause suspension controller 39 to instantly (or nearly instantly) change the suspension to its firmest mode. For example, if the vehicle is about to, or is encountering an event such as an obstacle that would cause a harsh or dangerous condition (such as bottom out, roll over, or the like), sensor data 301 would describe an event which identifies as an event that suspension controller 39 should respond to by changing one or more active dampers to a firm mode.

In one embodiment, suspension controller 39 could be programmed with different actions to take upon receipt of sensor data 301 based on vehicle location, vehicle speed, terrain, vehicle load, or the like. For example, if suspension controller 39 knows the vehicle is on a roadway, an event defined in sensor data 301 that is indicative of the suspension diving while the wheel is not being impacted by a force, would cause suspension controller 39 to initiate a firming of the front suspension due to hard braking.

In one embodiment, active valve damper adjustor 313 is configured to monitor and adjust at least one damping characteristic of the at least one active valve damper (e.g., active valve damper 38 and/or active valve damper 288). That is, active valve damper adjustor 320 will provide adjustment command 328 to at least one active valve.

In one embodiment, transmitter 325 transmits a suspension adjustment command 328 to one or more active dampers. In one embodiment, the suspension adjustment command 328 is a command for the active damper to soften. For example, sensor data 301 includes information about an event that has occurred at a wheel (such as the front wheel for example), the event is a bump or the like that is above a threshold value. When suspension controller 39 receives the event information, it is received, evaluated, active valve damper adjustor 320 will generate the suspension adjustment command 328 to soften the damper via an adjustment to at least one active valve of the damper, the transmitter 325 will then transmit the suspension adjustment command 328 to the damper (e.g., front fork damper 288).

In one embodiment, transmitter 325 will also transmit information 329 to sensor 35 (the sensor that provided the sensor data 301), to let sensor 35 know that the information was received. In other words, there is an acknowledgement and a payload.

In one embodiment, included in the information 329 may be additional information in addition to the message received indication. For example, in one embodiment, information 329 will include information such as event threshold values, upcoming changes to event threshold values, and the like.

In one embodiment, timer 315 begins to toll when the sensor data 301 about the event is received. In one embodiment, the timer 315 will run for a certain amount of time. In one embodiment, the timer 315 is 0.5 seconds. However, in one embodiment, the timer could be set to another value or could be a value that is dependent upon location, terrain, or the like. In one embodiment, the length of time measured by the timer 315 is fixed e.g., set by a manufacturer. In one embodiment, the length of time measured by the timer 315 is adjustable by a manufacturer, a user, a mechanic, a technician, or the like.

Using the example where the timer is a 0.5 second timer, if no further sensor data 301 is received during the 0.5 seconds, then timer 315 will trigger a suspension return command 326 that will be transmitted to the damper (e.g., front fork damper 288 in this example). When front fork damper 288 receives the suspension return command 326, the active damper will dismiss the suspension adjustment command 328 override. In one embodiment, the suspension return command 326 will include information that will cause the active damper to return to its previous firmness settings, to a preprogrammed setting, to a new setting automatically determined by suspension controller 39, to a location-based setting, a terrain-based setting, or the like.

If further sensor data 301 is received during the 0.5 seconds, then timer 315 will reset at the receipt of each new sensor data 301 (from the same sensor) and the 0.5 second countdown will begin anew. If there is no additional sensor data 301 received during the new timer countdown, then timer 315 will trigger the suspension return command 326 that will be transmitted to the damper (e.g., front fork damper 288).

In other words, when encountering successive bumps above the bump threshold, the sensor sends sensor data 301 (which would in one embodiment, be an above threshold message) at a rate of 10 Hz. When the terrain smooths out, the sensor stops sending sensor data 301 and timer 315 is no longer being reset with the sensor data 301 messages. Thus, using the above example, 0.5 seconds after the last sensor data 301 is received, timer 315 will expire and the suspension return command 326 is sent.

For example, during a ride, bicycle 50 encounters really bumpy terrain for 3 seconds and then the trail smooths out. At the first over threshold bump strike, bump sensor 35 sends sensor data 301 to suspension controller 39. Suspension controller 39 opens the suspension (e.g., softens the damping of damper 288). For the next 3 seconds, the bump sensor continues to send sensor data 301 at a rate of 10 Hz. During this period, the timer 315 is resetting as each sensor data 301 packet is received. When the trail smooths out (e.g., at the 3 second mark in this example), the last sensor data 301 message will have already been sent by the sensor 35. That is, after the trail smooths out, there would be no over threshold events, and thus no sensor data 301 data sent from sensor 35.

Because no more sensor data 301 messages are received, timer 315 is not reset and is allowed to run down to zero. When the timer 315 finishes, e.g., after the time period had tolled, the suspension return command 326 is triggered and sent by transmitter 325 to the one or more active damper components. Thus, using the above example, the suspension return command 326 is triggered and sent by transmitter 325 3.5 seconds after the first sensor data 301 message was received (e.g., 3 seconds of sensor data 301 messages plus the 0.5 second timer clock).

Security

In one embodiment, the wireless communication pairing is made resistant against attempts made by unauthorized actors trying to attack and control the system by performing authentication and encryption between the wireless components. In general, examples of system attacks include, but are not limited to, replay attacks, impersonation, denial of service, and the like.

In one embodiment, the authentication and encryption between the wireless components includes the utilization of AES 128, or the like. For example, in one embodiment, the pairing procedure sets up all state required for the radio protocol to be secure, including the AES-128 symmetric key. Whenever a device—sensor 35, suspension controller 39, peripheral, etc.—is turned on, it generates a session-specific 4-byte nonce using a secure random number generator. This nonce is included in all communication between devices.

Within a single session, each device also stores a 4-byte sequence number, that starts at 0, and increments for every transmitted message. The AES-128 block cipher is operated in the Authenticated Encryption with Associated Data (AEAD) scheme, which allows encrypting the given plaintext, and authenticating associated plain text data. The AEAD scheme requires a 13-byte nonce value, referred to herein as AEADNonce. When the AES-128 symmetric key, and AEADNonce are unique for every packet, the connection is secured.

In one embodiment, the AEADNonce is constructed by concatenating the nonce of each device with the sequence number of the particular packet, for a total of 12 bytes, with the 13th byte padded with 00. This ensures the AEADNonce is unique, and the connection is therefore secure. In one embodiment, the application does not accept any packet which it receives that has a sequence number earlier than another packet it has already received. This ensures that replay attacks are not possible. To generate new packets with a valid sequence number, the attacker must know the AES-128 symmetric key.

In one embodiment, the pairing of one or more of the sensors, suspension controller(s), peripherals and the like, coupled with the vehicle is performed via an out-of-band method such as a proximity detection (e.g., any devices within a certain distance where the distance is defined by the size of the vehicle, an acoustic and/or ultrasonic technique that resonates through the vehicle (e.g., frame, body, etc.) to identify any devices attached to the vehicle, and the like.

In one embodiment, one or more of the sensors, suspension controller(s), peripherals and the like that are coupled with the vehicle may be paired via a UI aspect. For example, when a device (e.g., a sensor, peripheral, etc.) is added to a vehicle, the device will automatically initiate the pairing process.

Bluetooth Communications

In various embodiments, communication between the components uses wireless communications. In one embodiment, those wireless communications are Bluetooth communication channels. In one embodiment, the communications can use one, some, or all of the different Bluetooth channels to transmit and receive information. However, in some embodiments, where a larger data packet does not need to be communicated, the wireless communication can use smaller packed data transmission capabilities at higher transmission rates, such as available on Bluetooth 5 protocol. Thus, one embodiment, using the Bluetooth 5 protocol, allows the components on the vehicle to use a smaller data packet size with increased speed to provide a faster transmission rate between components.

For example, Bluetooth Low Energy (LE) uses 40 different frequency channels (PHY channels), separated by 2 MHz. Three of these channels are labeled primary advertisement channels, while the remaining 37 channels are for secondary advertisements and data channels for transfers during a connection. In general, advertisements are used by devices to broadcast data and info for other observer devices to discover and process. It allows the device to broadcast this information for multiple devices to discover without a connection between the observers and broadcaster.

The three primary advertisement channels (e.g., channels 37, 38 & 39) are divided into advertising events where each event can occur on each of the 3 advertising PHY channels (or a subset). In one embodiment, consecutive events start with the first advertising PHY channel (e.g. if advertisements start with channel 37, then each event will start with an advertisement packet sent on channel 37).

In contrast, secondary advertisement channels (e.g., same as the data channels used during a connection—channels 0-36) are not part of the advertisement event, but rather part of the extended advertisement event. These begin at the same time as the advertisement event on the primary channel and end with the last packet on the secondary channel. The secondary channels are used to offload data that would otherwise exist on the primary channel (e.g., auxiliary packets). In general, an advertisement packet on the primary channel contains the PHY channel and the offset to the start time of the extended advertisement packet. The secondary advertisement channel can use any LE PHY (Uncoded 1M PHY, Uncoded 2M PHY, or Coded S=8 or S=2 PHY). For example, advertisements will start with advertisement packets sent on the 3 primary channels (or a subset of these channels). Extra information can then be offloaded to the Secondary advertisement channels to allow for more data to be broadcast.

Bluetooth 5 utilizes extended advertisements, e.g., a way to advertise more (offloaded) data than what's allowed with legacy advertisements. In general, offloading is accomplished by first advertising on the primary channel that points to an auxiliary packet on the secondary channel. As such, advertising sets are used to send out different types of advertising events simultaneously. Each advertisement set will have different advertisement parameters such as advertising PDU type, advertising interval, and PHY.

When advertising on the LE Uncoded 1M PHY, scan requests and responses can take place on the same PHY channel as the original advertisement or be offloaded to the secondary channel. In some cases when advertising on the Uncoded PHY, connection requests and responses are offloaded to the secondary channel.

When advertising on the LE Coded PHY, scan requests, scan responses, connection requests, and connection responses are always offloaded to the secondary channel.

Another feature of Bluetooth 5 extended advertisements are periodic advertisements. These are used for broadcasting packets to devices at a set period between two unconnected devices, meaning that more than one device can listen and tune in on these periodic advertisements. They consist of advertisements sent at a fixed interval with the advertisement data changing from time to time.

For example, the primary advertisement channel is used to transmit an ADV_EXT_IND PDU type which holds information (Time offset, PHY . . . etc) that can be used to find an AUX_ADV_IND PDU packet. That packet, in turn, contains a SyncInfo field which defines the data needed to synchronize to periodic advertisement packets (e.g., AUX_SYNC_IND and AUX_CHAIN_IND) in a way similar to how connections are formed (channel map, hop sequence, which PHY . . . etc).

Therefore, a scanner can target an advertising device by first discovering the advertisement event on the primary channel, and then tuning into the appropriate secondary channel and timing based on information sent in the primary advertisement packet.

In one embodiment, connectable devices can utilize the extended advertisements to send more data and allow connections on the secondary advertising channels, which can help avoid interference and noise from other devices broadcasting on the primary channels. Moreover, using periodic advertisements can help in making the broadcasting device more consistently discovered and monitored, with the possibility of the broadcast data being updated to reflect certain attributes and aspects of the broadcasting device. For example, in the case where a scanning device is always present in the proximity of a broadcasting device, now this scanning device can more consistently "follow" the advertiser and monitor its updates more frequently.

In one embodiment, the higher throughput is achieved when the components in communication with each other are using the new LE 2M PHY. In addition, when utilizing the higher speed PHY, a lower power consumption is achieved (for a transfer of the same amount of data). This is due to the radio-on time being reduced without the transmit power being increased. The reduced radio-on time, in turn, improves coexistence with other wireless technologies within the 2.4 GHz spectrum as crosstalk opportunities are reduced.

In one embodiment, the LE data packet includes a preamble (1 byte-1M PHY, or 2 bytes-2M PHY), access address (4 bytes), PDU (2-257 bytes) and CRC (3 bytes). In one embodiment, PDU can be further broken down into an LL header (2 bytes), a payload (0-251 bytes), and an optional MIC (4 bytes). In one embodiment, the payload can be further broken down into L2CAP header (4 bytes) and ATT data (0-247 bytes). In one embodiment, the ATT data can be further broken down into ATT header (1-3 bytes) and ATT payload (up to 244 bytes). In one embodiment, the ATT header can be further broken down to an op code (1 byte) and an attribute handle (2 bytes).

In one embodiment, it is the ATT payload in Bluetooth 4.2 and 5 that increases the maximum ATT payload from 20 bytes (legacy) to up to 244 bytes of data using data length extensions (DLE).

As described herein, in one embodiment, higher throughput is also obtained by using "write without response or notifications" to transfer the data from the client to the server and from the server to the client. These operations remove the need for the other device to acknowledge receipt of the data and respond before the next block of data can be sent.

In general, there are a few factors that impact the data throughput of a BLE application including: PHY being used (LE 1M vs. LE 2M vs. LE Coded (S=2 or S=8)), connection interval, maximum number of packets per connection interval, ATT Maximum Transmission Unit (ATT MTU), DLE, operation type: e.g., write with response vs. write without response, indications vs. notifications, inter frame space (IFS): time gap between consequent packets (150 us), transmission of empty packets, packet overhead—not all bytes, in a packet, are used for the application payload, and the like.

In general, there are three PHYs in Bluetooth 5: the original 1 Mbps PHY, the new 2 Mbps, and the coded PHY (with S=2, or S=8). The PHY used will directly impact the maximum achievable data throughput as it determines the actual raw data rate in which packets are sent over the air.

The connection interval effectively determines how many packets can be sent during one connection event. The higher the value, the more packets can be sent in one connection event.

ATT MTU Determines the max amount of data that can be handled by the transmitter and receiver and which they can hold in their buffers. For example, with DLE enabled, the data transfer can be up to 251−4=247 bytes (after deducting the L2CAP Header size). After taking into account the ATT header (3 bytes), there are a remaining 244 bytes for the actual ATT payload data. If the MTU is at least 247 bytes then the MTU will fit into one single packet. If the MTU is greater than 247 bytes, then the MTU will span multiple packets causing the throughput to go down (because of the packet overhead and timing in between the packets).

IFS is the time interval between two consecutive packets on the same channel index. It is defined as the time from the end of the last bit of the previous packet to the start of the first bit of the subsequent packet (presently 150 ms).

In general, the Bluetooth version and PHY determine the raw data transfer rate. For example, using Bluetooth version 4.2 and the LE 1M PHY the transfer rate is at 1 Mbps. In contrast, using the Bluetooth 5 LE Coded PHY with S=8, the data rate goes down to 125 kbps.

The DLE, ATT MTU, connection interval, the maximum number of packets per connection interval, Operation, and IFS all determine the portion of the on-radio time that's utilized for actual data transfer.

In one embodiment, to optimize data throughput, DLE is enabled, LE 2M PHY is used, notifications and writes without responses is enabled, the ATT MTU value is set to be at least greater than 247 bytes, and the connection interval is set to allow for the maximum number of packets per connection interval.

In one embodiment, the wireless network includes a number of wireless communications protocols and optimization capabilities (e.g., communications optimizers or optimizations) to enhance the throughput, increase battery life, sort the relevance of overlapping communications, and the like.

In one embodiment, the wireless communications protocols and optimization capabilities provide a single radio protocol comprising dynamic parameters configured to adjust one or more parameters based on a real-time traffic communication versus a non-real-time traffic communication. In one embodiment, the wireless communications protocols and optimization capabilities provide a multiple radio protocol comprising dynamic parameters configured to adjust one or more parameters based on a real-time traffic communication versus a non-real-time traffic communication. In one embodiment, the wireless communications protocols and optimization capabilities use frequency-domain multiplexing to provide different logical transports for a real-time traffic communication versus a non-real-time traffic communication. In one embodiment, a first radio protocol is used for setup and a second radio protocol is used for low latency communications.

In one embodiment, the wireless communications protocols and optimization capabilities provide intelligent adjustment of radio operating parameters, where the parameters to be adjusted include, but are not limited to, a transmission power, a receiver sensitivity, and the like, in order to optimize battery life based on a link reliability, an interference potential, an interference susceptibility, and the like.

In one embodiment, the wireless communications protocols and optimization capabilities use an intelligent transmission scheduler to schedule activity for at least two components of the network.

In one embodiment, the wireless communications protocols and optimization capabilities use adaptive techniques to perform acts such as data minimization and link scheduling to reduce a power consumption and/or a transmission latency.

In one embodiment, the wireless communications protocols and optimization capabilities utilize communication interference resolution techniques such as frequency hopping, spread spectrum operations, code-division multiple access (CDMA), global system for mobiles (GSM), and the like to maintain BAN, intra-vehicle, and or inter-vehicle communication operations in a busy environment (e.g., at a race, gathering, rally, ride, festival, or the like). For example, when a plurality of different vehicles are within the same vicinity/spectrum and some or all of the vehicles have wireless communications occurring thereon.

In one embodiment, the communications module is a BMD-350. Although a BMD-350 module is disclosed herein as one embodiment of a communications module used in the present discussion, it should be appreciated that another embodiment may utilize a different communications module and/or different components, protocols, and the like.

In general, BMD-350 is a stand-alone Bluetooth 5 low energy (LE) module that can be used individually or as part of a Bluetooth mesh. BMS-350 is an ultra-low power module based on the nRF52832 SoC from Nordic Semiconductor. BMD-350 has an Arm® Cortex®-M4 with FPU 32-bit processor, embedded 2.4 GHz transceiver, and integrated antenna, to provide a complete RF.

BMD-350 includes an AES-128 security capability. The available LE connections include, concurrent central, observer, peripheral, and broadcaster roles with up to twenty concurrent connections along with one Observer and one Broadcaster (S132).

BMD-350 radio frequency range is 2.360 GHz to 2.500 GHz; the modulations are gaussian frequency-shift keying (GFSK) at 1 Mbps, 2 Mbps data rates. BMD-350 has a transmit power+4 dBm maximum, a receiver sensitivity −96 dBm (LE mode), and a ceramic chip antenna (1 dBi peak).

BMD-350 with the nRF52832 SoC supports the S132 (Bluetooth low energy Central and Peripheral), S212 (ANT) and S312 (ANT and Bluetooth low energy) SoftDevices.

BMD-350 current consumption are defined for the following settings:

(1) transmit (TX) only @ +4 dBm, 0 dBm @ 3V, DCDC enabled 7.5 mA, 5.3 mA.
(2) TX only @ +4 dBm, 0 dBm 16.6 mA, 11.6 mA.
(3) receive (RX) only @ 1 Mbps @ 3V, DCDC enabled 5.4 mA.
(4) RX only @ 1 Mbps 11.7 mA.
(5) central processing unit (CPU) @ 64 MHz from flash, from RAM 7.4 mA, 6.7 mA.
(6) CPU @ 64 MHz from flash, from RAM @ 3V, DCDC 3.7 mA, 3.3 mA.
(7) System Off, On 0.3 µA, 1.2 µA.
(8) Additional current for RAM retention 30 nA/4 KB block.

In one embodiment, once the bumper sensor(s) 35 are connected to the suspension controller 39, the ESB protocol (or similar ISM Band Technology) takes over.

Active Valve

In this discussion, the term "active", as used when referring to a valve or damping component, identifies a component that is adjustable, manipulatable, etc., during typical operation of the valve. For example, an active valve (or live valve, etc.) can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used.

It should also be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In this discussion, the term "manual" as used when referring to a valve or damping component identifies a component that is manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the movement of the wheels (or other terrain encountering component) relative to the suspended portion of the vehicle. Moreover, "active suspensions" may be defined as either a "pure active suspension" or a "semi-active suspension" (a "semi-active suspension" is also sometimes referred to as an "adaptive suspension").

In a "pure active suspension", a motive source such as, for example, an actuator, is used to move a wheel with respect to the vehicle. In a "semi-active suspension", no motive force/actuator is employed to adjust the movement of the wheels (or other terrain encountering component) relative to the suspended portion of the vehicle. Rather, in a "semi-active suspension", the characteristics of the suspension (e.g., the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust the movement of the wheels (or other terrain encountering component) relative to the suspended portion of the vehicle. As such, it will be understood that an "active valve", as defined above, is well suited for use in a "pure active suspension" or a "semi-active suspension".

In various embodiments, an active valve can be manually operated, automatically operated, and/or remotely operated and can be used in a variety of ways with many different driving and road variables and/or utilized at any point during the operation of a vehicle. For example, in one embodiment, the active valve will modify one or more characteristics of a suspension component (e.g., an active damper) based upon vehicle speed in conjunction with the angular location of the vehicle's steering wheel.

Additional information and examples regarding active, semi-active, and manual valves, including those used for compression and/or rebound stiffness adjustments, preload adjustments, bottom-out control, preload adjustment, ride height adjustment, and the like can be found is U.S. Pat. Nos. 9,353,818 and 9,623,716, the content of which are incorporated by reference herein, in their entirety.

Additional active and semi-active valve features are described and shown in U.S. Pat. Nos. 8,627,932; 8,857,580; 9,033,122; 9,120,362; and 9,239,090, the content of which are incorporated by reference herein, in their entirety.

In one embodiment, a transducer, such as an accelerometer, measures other aspects of the vehicle's suspension system, like axle force and/or moments applied to various parts of the vehicle, like steering tie rods, and provides sensor data that would ultimately cause the active valve to modify one or more characteristics of a suspension component (e.g., an active damper).

In one example, a pressure transducer measuring pressure in a vehicle tire will provide sensor data that would ultimately cause the active valve to modify one or more characteristics of a suspension component (e.g., an active damper).

Additional examples and embodiments for transducer type sensors that provide sensor data which may cause the active valve to modify one or more characteristics of a suspension component (e.g., an active damper) are described in U.S. Pat. Nos. 9,623,716 and 10,036,443, the content of which are incorporated by reference herein, in its entirety.

In one embodiment, braking pressure (as measured, for example, by a brake pedal (or lever) sensor or brake fluid pressure sensor or accelerometer) will provide sensor data that would ultimately cause the active valve to modify one or more characteristics of a suspension component (e.g., an active damper).

In still another example, a gyroscopic mechanism (or sensor) that monitors vehicle trajectory and identifies a "spin-out" or other loss of control condition provides sensor data that would ultimately cause the active valve to modify one or more characteristics of a suspension component (e.g., an active damper).

Additional examples and embodiments of sensors that provide sensor data which may cause the active valve to modify one or more characteristics of a suspension component are described in U.S. Pat. Nos. 9,033,122; 9,452,654; 10,040,329; 10,047,817; 10,060,499 the content of which are incorporated by reference herein, in their entirety.

Figure 7:
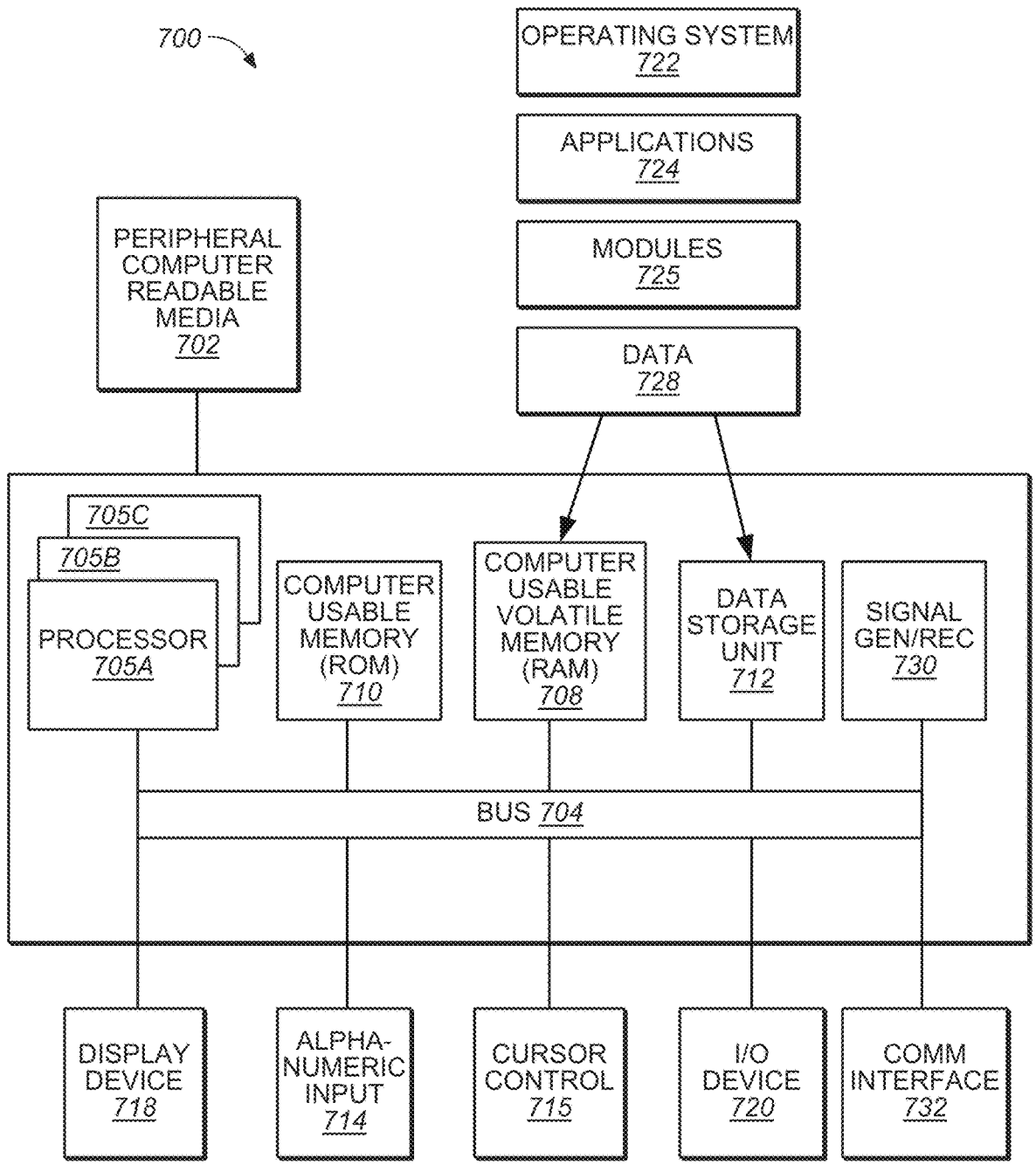
FIG. 7 is a block diagram of a computer system, in accordance with an embodiment.

With reference now to FIG. 7, an example computer system 700 is shown. In the following discussion, computer system 700 is representative of a system or components that may be used with aspects of the present technology. In one embodiment, different computing environments will only use some of the components shown in computer system 700.

In general, suspension controller 39, one or more sensor 35, switch 93, mobile device 95, and the like can include some or all of the components of computer system 700. In different embodiments, these devices can include wired and/or wireless communication capabilities as described herein.

In one embodiment, one or more of the suspension controller 39, one or more sensor 35, switch 93, mobile device 95, and the like can be communicatively coupled to one or more different computing systems to allow a user (or manufacturer, tuner, technician, etc.) to adjust or modify any or all of the programming stored thereon. In one embodiment, the programming includes computer-readable and computer-executable instructions that reside, for example, in non-transitory computer-readable medium (or storage media, etc.).

In one embodiment, computer system 700 includes peripheral computer readable media 702 which can include media such as, for example, an external storage drive, a compact disc, a flash memory, a universal serial bus (USB) flash memory, secure digital (SD) memory, MultiMediaCard (MMC) memory, an extreme Digital (XD) memory, a CompactFlash memory, a MemoryStick memory, a SmartMedia memory, and the like. In one embodiment, computer system 700 also includes an address/data/control bus 704 for communicating information, and a processor 705A coupled to bus 704 for processing information and instructions. As depicted in FIG. 7, computer system 700 is also well suited to a multi-processor environment in which a plurality of processors 705A, 705B, and 705C are present. Conversely, computer system 700 is also well suited to having a single processor such as, for example, processor 705A. Processors 705A, 705B, and 705C may be any of various types of microprocessors. Computer system 700 also includes data storage features such as a computer usable volatile memory 708, e.g., random access memory (RAM), coupled to bus 704 for storing information and instructions for processors 705A, 705B, and 705C.

Computer system 700 also includes computer usable non-volatile memory 710, e.g., read only memory (ROM), coupled to bus 704 for storing static information and instructions for processors 705A, 705B, and 705C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 705A or processors 705A, 705B, and 705C. Computer system 700 also can optionally include a cursor control device 715 coupled to bus 704 for communicating user input information and command selections to processor 705A or processors 705A, 705B, and 705C. Cursor control device may be a touch sensor, gesture recognition device, and the like. Computer system 700 of the present embodiment can optionally include a display device 718 coupled to bus 704 for displaying information.

Referring still to FIG. 7, display device 718 of FIG. 7 may be a liquid crystal device, cathode ray tube, OLED, plasma display device or other display device suitable for creating graphic images and alpha-numeric characters recognizable to a user. Cursor control device 715 allows the computer user to dynamically signal the movement of a visible symbol (cursor) on a display screen of display device 718. Many implementations of cursor control device 715 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 725, and data 728 are shown as typically residing in one or some combination of computer usable volatile memory 708, e.g., random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the Internet. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700.

Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 700 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. An orientationally flexible bump sensor comprising:
at least one bump sensor mounted to a vehicle, said at least one bump sensor comprising at least two axes of measurement; and
a computer processor configured to:
evaluate said at least two axes of measurement to determine which axis of said at least two axes of measurement has a highest magnitude vector;
determine a gain value to cause said highest magnitude vector to be approximately 1 g; and
assign said gain value to said axis with said highest magnitude vector, such that said gain value is applied to each measurement generated by said axis with said highest magnitude vector, such that said orientationally flexible bump sensor provides accurate measurement results regardless of an orientation of said orientationally flexible bump sensor with respect to a ground plane.

2. The orientationally flexible bump sensor of claim 1, further comprising:
said at least one bump sensor mounted to said vehicle at an orientation such that neither of said at least two axes of measurement are perpendicular to said ground plane.

3. The orientationally flexible bump sensor of claim 1, wherein said at least one bump sensor is mounted to a swingarm of said vehicle.

4. The orientationally flexible bump sensor of claim 1, further comprising:
said at least one bump sensor placed in a calibration state prior to said evaluation of said at least two axes of measurement by said computer processor.

5. The orientationally flexible bump sensor of claim 1, wherein said computer processor is a microprocessor of said at least one bump sensor.

6. The orientationally flexible bump sensor of claim 1, wherein said computer processor is a microprocessor of a suspension controller.

7. The orientationally flexible bump sensor of claim 1, wherein said at least one bump sensor has a wireless communication capability.

8. The orientationally flexible bump sensor of claim 1, wherein said at least one bump sensor has a wired communication capability.

9. A method for calibrating an orientationally flexible bump sensor, said method comprising:
generating at least two axes of measurement from a bump sensor mounted to a vehicle;
evaluating said at least two axes of measurement to determine which axis of said at least two axes of measurement has a highest magnitude vector;
determining a gain value to cause said highest magnitude vector to be approximately 1 g; and
assigning said gain value to said axis with said highest magnitude vector, such that said gain value is applied to every measurement generated by said axis with said highest magnitude vector, such that said orientationally flexible bump sensor provides accurate measurement results regardless of an orientation of said orientationally flexible bump sensor with respect to a ground plane.

10. The method of claim 9, further comprising:
mounting said bump sensor to said vehicle at an orientation such that neither of said at least two axes of measurement are perpendicular to said ground plane.

11. The method of claim 9, further comprising:
mounting said bump sensor to a swingarm of said vehicle.

12. The method of claim 9, further comprising:
placing said bump sensor into a calibration state prior to said evaluating of said at least two axes of measurement.

13. The method of claim 9, further comprising:
evaluating said at least two axes of measurement and determining said gain value with a microprocessor of said bump sensor.

14. The method of claim 9, further comprising:
evaluating said at least two axes of measurement and determining said gain value with a microprocessor of a suspension controller.

15. The method of claim 9, further comprising:
providing a wireless communication capability for said bump sensor.

16. The method of claim 9, further comprising:
providing a wired communication capability for said bump sensor.

17. An orientationally flexible bump sensor comprising:
at least one bump sensor mounted to a vehicle, said at least one bump sensor comprising three axes of measurement; and
a computer processor configured to:
  evaluate said three axes of measurement to determine which axis of said three axes of measurement has a highest magnitude vector;
  determine a gain value to cause said highest magnitude vector to be approximately 1 g; and
  assign said gain value to said axis with said highest magnitude vector, such that said gain value is applied to each measurement generated by said axis with said highest magnitude vector, such that said orientationally flexible bump sensor provides accurate measurement results regardless of an orientation of said orientationally flexible bump sensor with respect to a ground plane.

18. The orientationally flexible bump sensor of claim 17, further comprising:
  said at least one bump sensor mounted to said vehicle at an orientation such that none of said three axes of measurement are perpendicular to said ground plane.

19. The orientationally flexible bump sensor of claim 17, wherein said at least one bump sensor is mounted to a swingarm of said vehicle.

20. The orientationally flexible bump sensor of claim 17, further comprising:
  said at least one bump sensor placed in a calibration state prior to said evaluation of said three axes of measurement by said computer processor.

21. The orientationally flexible bump sensor of claim 17, wherein said computer processor is a microprocessor of said at least one bump sensor and said at least one bump sensor further comprises:
  a wireless communication capability.

* * * * *